(No Model.)
J. C. MICHAEL.
NIPPLE.
No. 589,212. Patented Aug. 31, 1897.
*Fig. 1,*
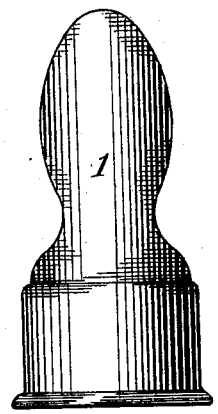
*Fig. 2,*
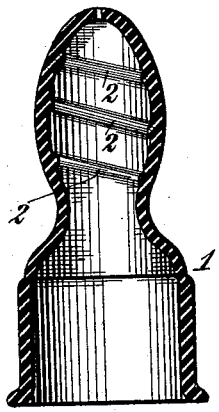
WITNESSES:
INVENTOR
J. C. Michael
BY
ATTORNEYS

UNITED STATES PATENT OFFICE.

JACOB C. MICHAEL, OF NEWARK, NEW JERSEY, ASSIGNOR, BY MESNE ASSIGNMENTS, TO FRANCIS R. McDERMOTT, OF BROOKLYN, NEW YORK.

NIPPLE.

SPECIFICATION forming part of Letters Patent No. 589,212, dated August 31, 1897.

Application filed December 26, 1896. Serial No. 617,020. (No model.)

*To all whom it may concern:*

Be it known that I, JACOB C. MICHAEL, a citizen of the United States, residing at Newark, in the county of Essex and State of New Jersey, have invented certain new and useful Improvements in Nursing-Nipples; and I do hereby declare the following to be a full, clear, and exact description of the invention, such as will enable others skilled in the art to which it appertains to make and use the same.

My invention relates to nursing-nipples, and in particular to an improvement in the construction of nursing-nipples by which the collapse of the nipple when in use may be prevented and a passage for air and milk maintained at all times; and my invention consists in the novel construction of the nipple.

The object of my invention is to so construct nursing-nipples that collapse of the nipple to such an extent as to shut off the passage of air or the flow of milk when the nipple is in use may be entirely prevented without rendering the nipple difficult to clean and without rendering it expensive in construction. This object is attained in the nursing-nipple herein described and illustrated in the drawings which accompany and form a part of this specification, in which the same reference-numerals indicate the same or corresponding parts, and in which—

Figure 1 is a side view of my improved nipple, and Fig. 2 is a longitudinal section thereof, showing the spiral stiffening-rib.

In the use of nursing-nipples in the past trouble has been experienced because of the tendency of the nipple to collapse when in use, shutting off the flow of milk and preventing the passage of air. The effect of this collapse and the efforts of the child to draw milk through the nipple after the collapse are to cause colic. It is important, therefore, that the nipple shall be so constructed that collapse cannot take place when it is in use. The collapse of the nipple, which is of rubber and is elastic, is due to the combined effects of the pressure of the gums of the child upon it and to the suction produced by the child. To prevent collapse, nipples have been constructed with circular stiffening-ribs and also with straight longitudinal ribs. Neither of these constructions is entirely effective or will prevent somewhat frequent collapse of the nipple. If the gums of the child press upon the nipple between two circular ribs or beyond the ribs, they are likely to press the sides of the nipple together so tightly as to prevent the passage of milk or air. Moreover, the circular ribs interfere with the proper cleaning of the nipple if this cleaning is done with a swab. The straight longitudinal ribs also fail to prevent at all times collapse of the nipple, because between them the rubber is not supported or stiffened.

Instead of having circular or longitudinal stiffening-ribs my nipple is provided with one or more continuous internal spiral stiffening-ribs extending from the neck to the head of the nipple. The use of the spiral rib I find entirely prevents the collapse of the nipple and the shutting off of the passage of milk and air, because wherever the child's gums may press upon the nipple they are sure to press upon a portion of the spiral rib, and along the sides of this rib there are sure to be passages for air and milk. The spiral ribs also do not interfere with the cleaning of the nipple by the use of a swab, as the swab may be given a spiral motion and will then reach every portion of the internal surface of the nipple.

The construction of the nipple is clearly shown in the accompanying drawings.

1 is the nipple, which is of the ordinary form and construction, except that it is provided with one or more internal spiral ribs 2, extending from the neck to the head of the nipple. These ribs are formed in the molding of the nipple. The nipple is molded inside out, the mold being provided with grooves corresponding to the spiral rib to be formed. When taken from the mold, therefore, the rib is outside. The nipple is then turned or reversed, so as to bring the rib on the inside.

The cost of making the nipple, aside from the first cost of the mold, is but little, if at all, greater than the cost of making the ordinary plain nipple.

The nipple may be provided with one or more of the spiral stiffening-ribs, as may be thought preferable. The nipple shown in the drawings has but one rib.

Having thus completely described my invention, what I claim, and desire to secure by Letters Patent, is—

1. The herein-described nursing-nipple, formed of elastic material, and provided with one or more continuous spiral stiffening-ribs extending along the body of the nipple from the neck to the head thereof, by which the collapse of the nipple may be prevented and a passage through the nipple maintained at all times, substantially as described.

2. The herein-described nursing-nipple, formed of elastic rubber, and having a continuous internal spiral stiffening-rib formed integrally with it and extending along the body of the nipple from the neck to the head thereof, by which the collapse of the nipple may be prevented and a passage through the nipple maintained at all times, substantially as described.

In testimony whereof I affix my signature in presence of two witnesses.

JACOB C. MICHAEL.

Witnesses:
CAROLINE E. DAVIDSON,
HARRY M. MARBLE.